United States Patent
Pasolini et al.

(10) Patent No.: US 7,450,332 B2
(45) Date of Patent: Nov. 11, 2008

(54) FREE-FALL DETECTION DEVICE AND FREE-FALL PROTECTION SYSTEM FOR A PORTABLE ELECTRONIC APPARATUS

(75) Inventors: Fabio Pasolini, San Martino Siccomario (IT); Michele Tronconi, San Martino Siccomario (IT); Wen Lin, Longmont, CO (US); William R. Raasch, Longmont, CO (US)

(73) Assignees: STMicroelectronics, Inc., Carrollton, TX (US); STMicroelectronics S.R.L., Agrate Brianza (IT)

( * ) Notice: Subject to any disclaimer, the term of this patent is extended or adjusted under 35 U.S.C. 154(b) by 240 days.

(21) Appl. No.: 11/166,770

(22) Filed: Jun. 24, 2005

(65) Prior Publication Data

US 2006/0152842 A1    Jul. 13, 2006

Related U.S. Application Data

(60) Provisional application No. 60/590,997, filed on Jul. 26, 2004.

(30) Foreign Application Priority Data

Jun. 28, 2004    (IT)    ............................ TO2004A0436

(51) Int. Cl.
  G11B 21/02    (2006.01)
  G11B 19/02    (2006.01)
(52) U.S. Cl. .................... 360/75; 360/69; 360/78.04
(58) Field of Classification Search ............... None
See application file for complete search history.

(56) References Cited

U.S. PATENT DOCUMENTS

| 4,692,915 | A |  | 9/1987 | Moriya et al. |
| 4,745,564 | A |  | 5/1988 | Tennes et al. |
| 4,862,298 | A |  | 8/1989 | Genheimer et al. |
| 4,862,394 | A | * | 8/1989 | Thompson et al. .......... 702/166 |
| 4,873,871 | A |  | 10/1989 | Bai et al. |
| 5,227,929 | A |  | 7/1993 | Comerford |

(Continued)

FOREIGN PATENT DOCUMENTS

EP        0 444 449        9/1991

(Continued)

OTHER PUBLICATIONS

European Search Report EP 05 10 5662; Aug. 23, 2006.

*Primary Examiner*—Joseph Feild
*Assistant Examiner*—Jason Olson
(74) *Attorney, Agent, or Firm*—Hogan & Hartson LLP (57) ABSTRACT

In an integrated free-fall detection device for a portable apparatus an acceleration sensor generates acceleration signals correlated to the components of the acceleration of the portable apparatus along three detection axes. A dedicated purely hardware circuit connected to the acceleration sensor generates a free-fall detection signal in a continuous way and in real-time. The free-fall detection signal has a first logic value in the event that the acceleration signals are simultaneously lower than a respective acceleration threshold, and is sent to a processor unit of the portable apparatus as an interrupt signal to activate appropriate actions of protection for the portable apparatus. Preferably, the acceleration sensor and the dedicated purely hardware circuit are integrated in a single chip and the acceleration sensor is made as a MEMS.

27 Claims, 5 Drawing Sheets

U.S. PATENT DOCUMENTS

| | | |
|---|---|---|
| 5,235,472 A | 8/1993 | Smith |
| 5,299,075 A | 3/1994 | Hanks |
| 5,333,138 A | 7/1994 | Richards et al. |
| 5,452,612 A | 9/1995 | Smith et al. |
| 5,504,356 A | 4/1996 | Takeuchi et al. |
| 5,521,772 A | 5/1996 | Lee et al. |
| 5,723,789 A | 3/1998 | Shannon |
| 5,763,982 A * | 6/1998 | Tabota et al. ............... 310/329 |
| 5,835,298 A | 11/1998 | Edgerton et al. |
| 5,982,573 A | 11/1999 | Henze |
| 6,003,374 A | 12/1999 | Vigna et al. |
| 6,046,877 A | 4/2000 | Kelsic |
| 6,115,200 A | 9/2000 | Allen et al. |
| 6,520,013 B1 | 2/2003 | Wehrenberg |
| 6,738,214 B2 | 5/2004 | Ishiyama et al. |
| 6,768,066 B2 | 7/2004 | Wehrenberg |
| 2004/0125493 A1 * | 7/2004 | Shimotono et al. ............ 360/75 |
| 2004/0252403 A1 | 12/2004 | Wehrenberg et al. |

FOREIGN PATENT DOCUMENTS

| | | |
|---|---|---|
| EP | 0 658 894 A1 | 7/1994 |
| EP | 0 826 967 A1 | 3/1998 |
| JP | 3252962 | 11/1991 |
| JP | 5198078 | 8/1993 |
| JP | 6275002 | 9/1994 |
| WO | WO 2006/060077 A1 | 6/2006 |

* cited by examiner

Fig.1
PRIOR ART

| Impact Deceleration | Height (m) | Fall time (s) |
|---|---|---|
| 170 | 0.102 | 0.1439 |
| 190 | 0.127 | 0.1609 |
| 208 | 0.152 | 0.1763 |
| 224 | 0.178 | 0.1904 |
| 240 | 0.203 | 0.2036 |
| 268 | 0.254 | 0.2276 |
| 379 | 0.508 | 0.3219 |
| 464 | 0.762 | 0.3942 |
| 536 | 1.016 | 0.4552 |
| 600 | 1.270 | 0.5089 |
| 657 | 1.524 | 0.5575 |
| 709 | 1.778 | 0.6022 |
| 758 | 2.033 | 0.6437 |
| 804 | 2.287 | 0.6828 |
| 848 | 2.541 | 0.7197 |

FREE-FALL DETECTION DEVICE AND FREE-FALL PROTECTION SYSTEM FOR A PORTABLE ELECTRONIC APPARATUS

RELATED APPLICATION

The present application claims priority of U.S. Provisional Patent Application No. 60/590,997 filed Jul. 26, 2004, entitled HDD FREE FALL PROTECTION SYSTEM IN PORTABLE PERSONAL ELECTRONIC DEVICES WITH 3 AXIS DIGITAL MEMS SENSOR, and also claims priority of Italian Patent Application No. TO2004A000436 filed Jun. 28, 2004, both applications being incorporated herein in their entireties by this reference.

FIELD OF THE INVENTION

The present invention relates to a free-fall detection device and to a free-fall protection system for a portable electronic apparatus, in particular for the protection of a mass-storage device (HDD—Hard Disk Drive) in the portable electronic apparatus, to which the following description will make explicit reference without this implying any loss of generality.

BACKGROUND OF THE INVENTION

As it is known, in portable mobile applications HDD devices are more and more frequently incorporated into personal electronic and personal computer products. This is because HDD high capacity, fast speed, and low price combination surpasses any other memory product, making them the best choice for data storage in portable apparatuses, such as laptop computers, Personal Data Assistants (PDAs), digital audio players, mobile phones, digital cameras, and the like.

Figure 1:
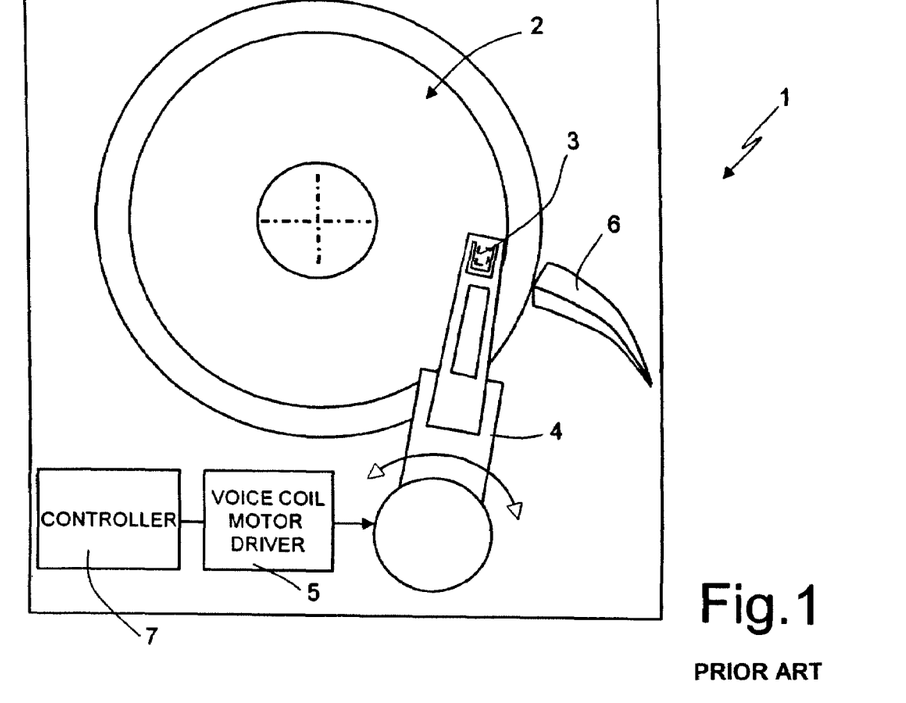
FIG. 1 shows a schematic representation of a Hard Disk Drive device of a known type.

FIG. 1 shows schematically the structure of a typical HDD device 1. In a per se known manner, the HDD device 1 comprises: a rotating disk 2, provided with a magnetic thin film as a data-storage medium and being rotated around an axis by a spindle motor (not shown); a read/write head 3 which is carried by an arm 4 and is suspended over the rotating disk 2, and which comprises a magnetic transducer that magnetically transfers information to and from the data-storage medium; a voice coil motor driver 5 for moving and positioning the arm 4 over the rotating disk 2; a parking ramp 6; and a microprocessor controller 7 for controlling operation of the HDD device 1, and particularly of the voice coil motor driver 5 and the spindle motor. When in operation, the read/write head 3 is positioned over specific locations of the rotating disk 2 for reading data from and writing data to the associated data-storage medium. Under certain circumstances, such as when the HDD device 1 is in power down or in low power consumption mode, the read/write head 3 is moved away from the surface of the rotating disk 2 and parked in a detent position at the parking ramp 6.

Due to their portable nature, the above electronic portable apparatuses are accident prone and may easily undergo violent impacts, in particular in the case where they are dropped onto the floor during normal use. In the case of a fall, the impact of the portable apparatus with the ground has repercussions on the associated HDD device 1, in the worst case producing damage and consequent permanent loss of data. In fact, the HDD device 1 is very sensitive to impact, in so far as, in order to ensure its proper operation, the read/write head 3 is normally kept at a very small distance from the associated data-storage medium. Consequently, in the case of an impact, the read/write head 3 collides with and may get damaged together with the data-storage medium, causing irreversible loss of the data stored within.

To prevent, or at least limit, the occurrence of the above destructive events, HDD protection systems based upon the detection of a condition of free-fall of the portable apparatuses have been proposed.

As it is known, an object is considered to be in free-fall when it is falling under the only influence of gravity; in other words, any object which is moving and being acted upon the sole force of gravity is said to be in a state of free-fall. The following is the module of the free-fall equation of an object which is in free-fall condition, assuming a zero velocity at the beginning of the fall:

$$h = \frac{1}{2} \cdot g \cdot t^2$$

where h is the initial height of the fall, g is the acceleration of gravity (9.81 m/s$^2$), and t is the fall time. By way of example, and using the above equation, a fall time of about 378 ms can be calculated from a typical desktop height of about 0.7 m. An impact deceleration force can also be calculated using the following equation:

$$A = \frac{\pi \cdot R \cdot \sqrt{2 \cdot g \cdot h}}{2 \cdot t}$$

Figure 2:
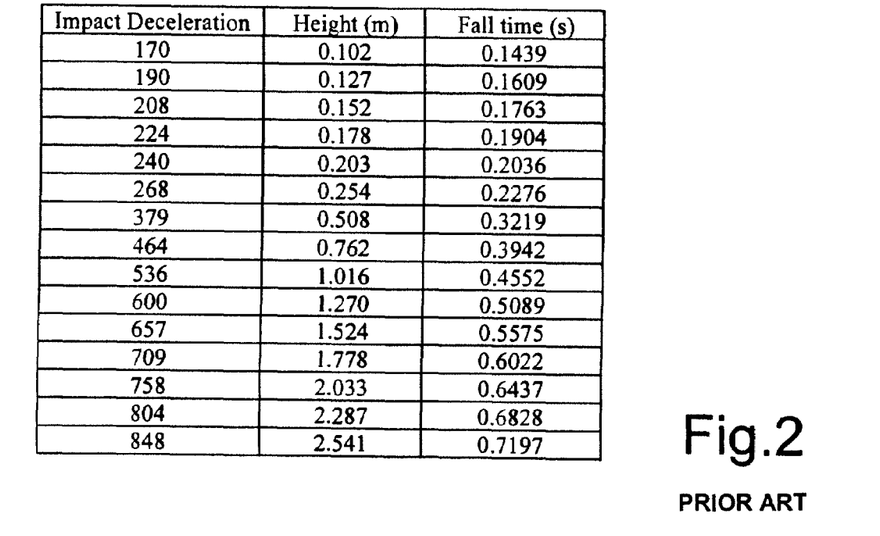
FIG. 2 is a table showing values of free-fall related quantities as a function of the height of the fall.

The table of FIG. 2 shows the impact deceleration force A (normalized to the g value), and fall time t based on the height h of the fall, assuming a rebound factor of 1.5 (where 1 means no rebound, and 2 means 100% rebound) and a shock duration of 2 ms.

In particular, following upon a free-fall detection, the above HDD protection systems issue appropriate actions for protecting the electronic portable apparatus, e.g. they command for retracting the read/write head 3 from the disk surface up to the positioning ramp 6. As a result, upon impacting the ground of the HDD device 1, the read/write head 3 and the rotating disk 2 do not collide, thus preventing the HDD device 1 from damage, or in any case limiting the extent of such damage.

For example, considering that a typical HDD device of a portable PC system can sustain 800 g non operating shocks and 225 g operating shocks, from the above table it follows that the HDD device can sustain impact if it falls from height below 0.178 m. The HDD device can not sustain impact if it falls from height above 2.282 m, because the impact deceleration force A is over the non operating shock level. With the above protection systems, the HDD device may sustain fall impact between 0.178 m to 2.282 m by placing the read/write head 3 to the ramp position, therefore greatly reducing the possibility of damage and loss of data.

In greater detail, the free-fall condition of the portable electronic apparatus is detected by using an acceleration sensor, fixed to the portable electronic apparatus. In particular, a free-fall condition is detected when the magnitude of the acceleration vector calculated from the acceleration sensor output falls within a preset range of values. In general, since it is not possible to determine the orientation of the portable apparatus during its free-fall, a three-axis acceleration sensor is used, the acceleration vector being the vector sum of the acceleration components along three mutually orthogonal axes.

To obtain an efficient protection against impact, the free-fall condition must be detected in the shortest time possible so as to enable subsequent activation of the appropriate actions of protection. In known HDD protection systems, a microprocessor is used to poll and to acquire the acceleration sensor outputs, to calculate the acceleration vector and its magnitude, and to compare the calculated magnitude against to a pre-programmed threshold value. In particular, the main microprocessor of the portable electronic apparatus that it is desired to protect or the controller of the HDD device, or even a dedicated microprocessor are used for this purpose.

A solution of this sort does not always enable detection of the condition of free-fall with a promptness sufficient to prevent damage to the portable electronic apparatuses. In fact, if the main microprocessor of the portable electronic apparatus, or the microprocessor of the HDD device controller are used, the same microprocessors must perform a plurality of functions, and are used in "time sharing" by the various resources and cannot dedicate the majority of their computing power and time to monitoring the output of the accelerometer. It follows that the free-fall event can occur during a time interval in which the microprocessor is occupied to manage other resources, and the free-fall can thus be detected too late to avoid damage to the portable electronic apparatus. Also, even if a dedicated microprocessor is used (solution that can be anyway too expensive for most applications), if the free-fall event happens in between two consecutive acquisition cycles, there is a latency time before the free-fall event can be reported (the worst latency time being a full sample time interval). In addition to this latency time, microprocessor instructions execution time (e.g. for the calculation of the vector sum and magnitude thereof) also needs to be accounted for the overall free-fall detection time.

The aim of the present invention is to provide a free-fall detection device and a free-fall protection system for a portable electronic apparatus which are free from the drawbacks referred to above and in particular operate in a more reliable way, and allow for a prompter detection of a free-fall condition of the portable electronic apparatus.

SUMMARY OF THE INVENTION

According to the present invention relates to a free-fall detection device for a portable apparatus which includes an acceleration sensor which generates a first acceleration signal and a second acceleration signal correlated to a respective component of a sensed acceleration along a respective detection axis, and also includes a free-fall detection module connected to the acceleration sensor. The device is configured to conduct a comparison between each of the first and second acceleration signals and a respective acceleration threshold and generate a free-fall detection signal according to the result of both comparisons.

The present invention further relates to a free-fall protection system for a portable apparatus which includes a free-fall detection device which issues a warning signal upon detecting a free-fall condition of the portable apparatus. The protection device which is connected to the free-fall detection device is configured to activate protection actions for the portable apparatus upon receiving the warning signal.

BRIEF DESCRIPTION OF THE DRAWINGS

For a better understanding of the present invention, preferred embodiments thereof are now described, purely by way of non-limiting example and with reference to the attached drawings, wherein.

DETAILED DESCRIPTION

Figure 3:
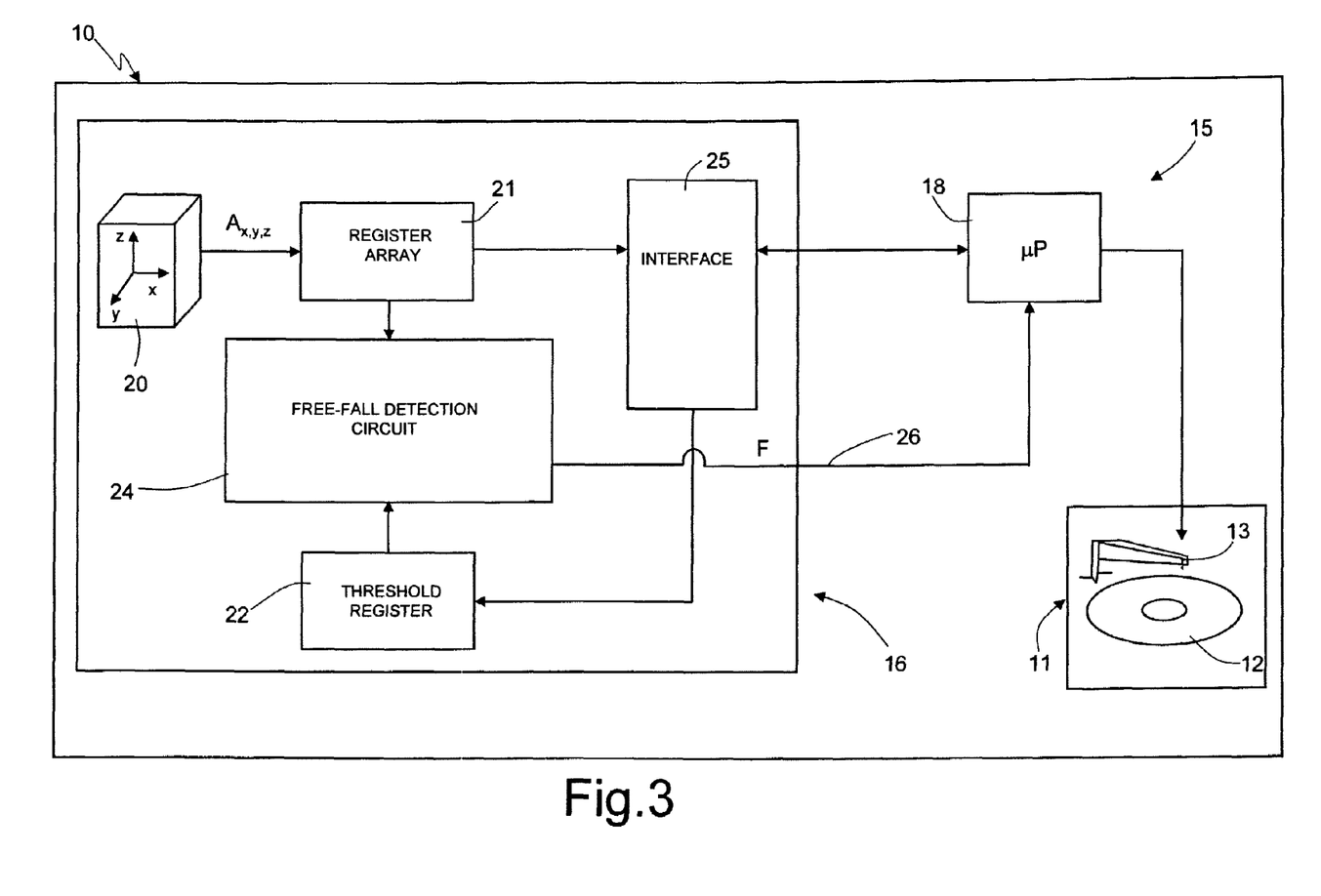
FIG. 3 is a block diagram of a portable electronic apparatus provided with a free-fall protection system according to the present invention.

FIG. 3 is a schematic illustration of a portable electronic apparatus 10 provided with a Hard Disk Drive device 11 comprising in a known way a data-storage medium 12 and a read/write head 13, and with a free-fall protection system 15, which is connected to the HDD device 11 and is configured to protect the Hard Disk Drive device 11 from a free-fall event.

In detail, the free-fall protection system 15 comprises a free-fall detection device 16 and a processor unit 18, connected to the free-fall detection device 16, and to the Hard Disk Drive device 11. The processor unit 18 can be a microprocessor, a digital signal processor (DSP), a microcontroller, a ASIC (Application Specific Integrated Circuit), or any other type of integrated processing unit. In particular, the free-fall detection device 16 is connected at output to an interrupt input of the processor unit 18.

The free-fall detection device 16 comprises: an accelerometer 20 of the linear type; a register array 21 connected to the output of the accelerometer 20; a threshold register 22; and a free-fall detection circuit 24 connected to the register array 21 and to the threshold register 22. The free-fall detection device 16 further comprises an interface 25 (e.g. a I2C/SPI interface), arranged between the processor unit 18 and the register array 21 and the threshold register 22. In particular, all the components of the free-fall detection device 16 are conveniently integrated in a single chip of semiconductor material.

The accelerometer 20 is of a known type, including a MEMS (Micro-Electro-Mechanical-Systems) structure based on the semiconductor technology, and has three detection axes x, y and z so as to generate three acceleration signals $A_x, A_y, A_z$, each correlated to the acceleration detected along a respective detection axis. For example, the accelerometer 20 can be realized as described in "3-axis digital output accelerometer for future automotive applications", B. Vigna et al., AMAA 2004.

Figure 4:
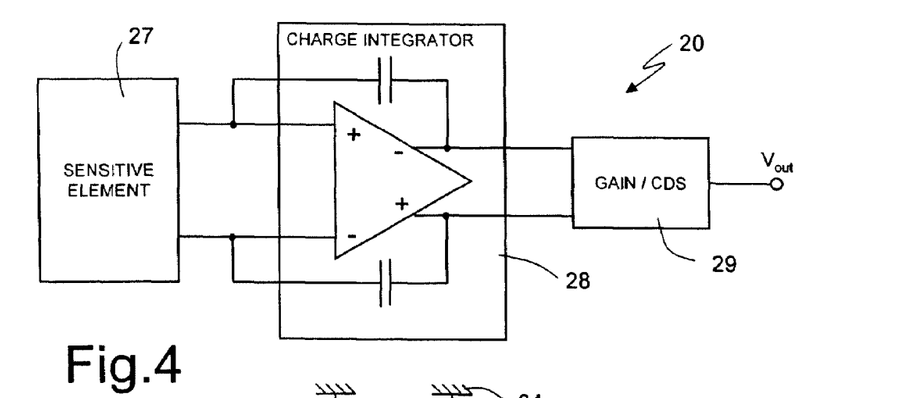
FIGS. 4-6 are schematic representations of a linear accelerometer of a MEMS type.

In brief, in a per se known manner, FIG. 4, the accelerometer 20 is made up of a sensitive element 27, which detects acceleration and generates an electrical signal correlated to the detected acceleration, and an electronic circuit for conditioning the electrical signal, which typically comprises a charge integrator 28 and a gain and noise-cancelling stage 29 (in particular, using the Correlated Double Sampling or CDS technique), which supplies an output signal $V_{out}$. As illustrated schematically in FIG. 5 (that refers to a uniaxial MEMS accelerometer for sake of clarity of illustration), the sensitive element 27 comprises a stator, of which only first and second fixed electrodes 30a, 30b are illustrated, and a rotor formed by a moving element 31 and mobile electrodes 32 fixed to the moving element 31, and each arranged between a respective first fixed electrode 30a and a respective second fixed electrode 30b. The moving element 31 is suspended by means of springs 33 to anchorage elements 34, so as to be movable along a detection axis.

Figure 6:
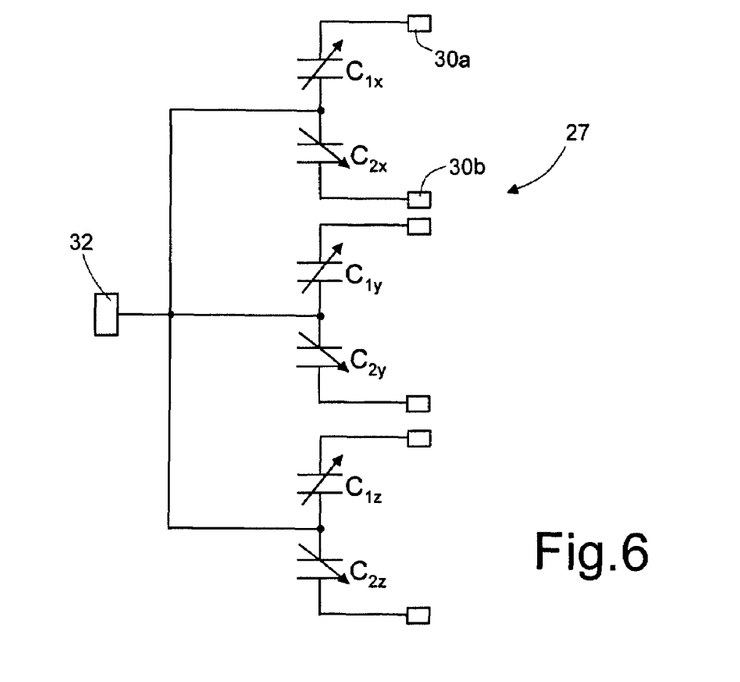

As illustrated in FIG. 6, the electrical equivalent circuit of the sensitive element 27 can be represented schematically with first capacitors $C_{1x}$, $C_{1y}$, $C_{1z}$ and second capacitors $C_{2x}$, $C_{2y}$, $C_{2z}$, one for each detection axis x, y, z; each one of the first capacitors being arranged in series with a respective one of the second capacitors, the capacitances of which being variable according to the distance between the mobile electrodes 32 and the fixed electrodes 30a, 30b and hence according to the displacement of the rotor with respect to the stator.

Figure 5:
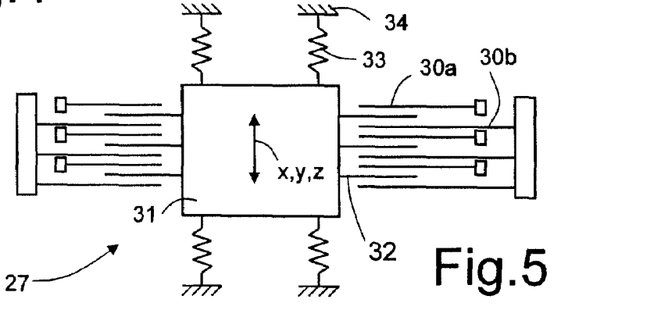

When the linear accelerometer 20 is subjected to an acceleration along a detection axis x, y, z, the moving element 31 moves along said axis, consequently a capacitive unbalancing is generated between the related first and second capacitors. This capacitive unbalancing is detected by the conditioning electronic circuit, which hence supplies at output the signal $V_{out}$.

In particular, the displacement of the moving element 31 occurs also in presence of a static acceleration (for example the acceleration of gravity), generating a corresponding capacitive unbalancing which is detected by the conditioning electronic circuit. It follows that, even in the resting condition, a non-zero acceleration is detected. Instead, during a free-fall, the displacement of the moving element 31 with respect to a reference system fixed with respect to the stator, which is also in free-fall, is zero (the mobile electrodes 32 remain centered with respect to the respective fixed electrodes 30a, 30b), so that the detected acceleration is almost (due to air friction) equal to zero.

In particular, the accelerometer 20 senses the movements of the electronic portable apparatus 10 and generates the corresponding acceleration signals $A_x$, $A_y$, $A_z$, which are sampled and hold in the register array 21. As will be described in greater detail hereinafter, the free-fall detection circuit 24 compares each one of the acceleration signals $A_x$, $A_y$, $A_z$ with a preset acceleration threshold $A_{th}$, stored in the threshold register 22, and generates a free-fall detection signal F, if certain conditions are met which are indicative of a free-fall event. The free-fall detection signal F is then sent to an output 26 of the free-fall detection device 16, to be sent in real time to the processor unit 18, as an interrupt signal for immediately activating appropriate actions for protecting the portable electronic apparatus 10. A typical action is to issue a command to the HDD device 11 through an industrial standard interface (such as ATA or SATA), for controlling a forced parking of the read/write head 13 in a safe position of the HDD device 11. Therefore, upon impacting the ground, the read/write head 13 and the data-storage medium 12 will not collide against each other, and damage to the HDD device 11 will be prevented.

The processor unit 18 can also access the data stored in the register array 21 through the interface 25, and program the acceleration threshold $A_{th}$ by writing in the threshold register 22.

Figure 7:
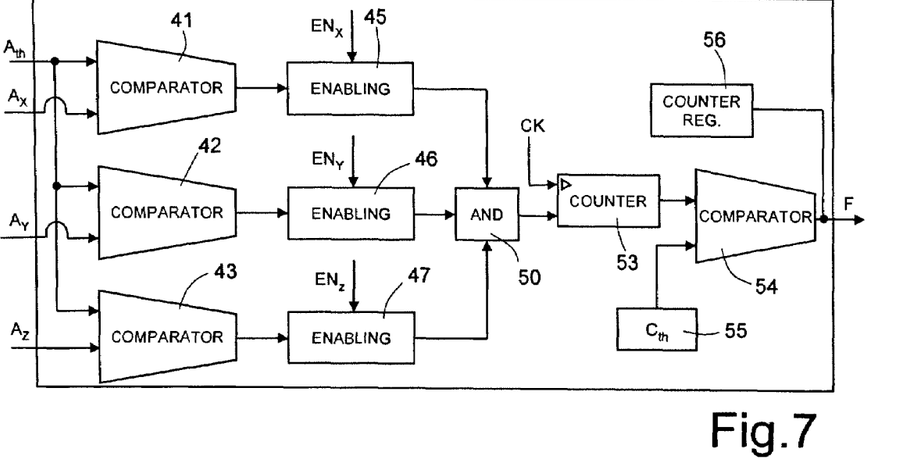
FIG. 7 is a more detailed block diagram of a free-fall detection circuit in the system of FIG. 3.

In detail, as shown in FIG. 7, the free-fall detection circuit 24 comprises a first threshold comparator 41, a second threshold comparator 42, and a third threshold comparator 43. The threshold comparators 41-43 receive at their inputs a respective acceleration signal $A_x$, $A_y$, $A_z$ from the accelerometer 20, and the acceleration threshold $A_{th}$ from the threshold register 22. The threshold comparators 41-43 compare the absolute value of the respective acceleration signal $A_x$, $A_y$, $A_z$ with the acceleration threshold $A_{th}$ and output a respective logic signal, for example of a high value, if the absolute value of the respective acceleration signal $A_x$, $A_y$, $A_z$ is smaller than the acceleration threshold $A_{th}$.

The free-fall detection circuit 24 further comprises three enabling stages 45, 46 and 47. In detail, each enabling stage 45-47, preferably made using logic gates, receives at its input the output of a respective threshold comparator 41-43 and an enabling signal $EN_x$, $EN_y$, $EN_z$, of a logic type. When the enabling signal $EN_x$, $EN_y$, $EN_z$ assumes a first logic value, for example high, the respective enabling stage 45-47 outputs the logic signal received by the respective threshold comparator 41-43. Otherwise, when the enabling signal $EN_x$, $EN_y$, $EN_z$ assumes a second logic value, in the example low, the enabling stage 45-47 outputs a constant logic signal of a high value.

The free-fall detection circuit 24 further comprises a three-input AND logic gate 50, receiving the outputs of the enabling stages 45-47; a counter 53, receiving the logic signal outputted by the AND logic gate 50 as count-enable signal and a clock signal CK generated in a per se known manner; and a threshold comparator 54, receiving the count signal generated by the counter 53 and a count threshold $C_{th}$, the latter being settable by writing in a dedicated register 55. In particular, the counter 53 is reset when the logic signal at the output of the AND logic gate 50 has a first logic value, for example low, while it is enabled for counting when the logic signal at the output of the AND logic gate 50 has a second logic value, for example high. The threshold comparator 54 outputs the free-fall detection signal F, which is supplied to the output 26 (FIG. 3) of the free-fall detection device 16, connected to the processor unit 18.

Finally, the free-fall detection circuit 24 comprises a counter register 56 connected to the output of the threshold comparator 54 for storing the free-fall detection signal F.

Operation of the free-fall detection circuit 24 is described hereinafter.

In particular, the principle of operation of the detection circuit 24 follows from the observation that, for any object in steady state, and thus subject to the only acceleration of gravity, it cannot happen that the acceleration along three mutually orthogonal axes x, y and z is lower than $1/\sqrt{3} \cdot g$ (0.577 g) at the same time. This is valid independently of the object orientation in the three-dimensional space. In fact, the magnitude A of the acceleration vector acting on the free-falling object can be calculated from the acceleration components along the three mutually orthogonal axes (acceleration signals $A_x$, $A_y$, $A_z$), with the following equation:

$$A=\sqrt{A_x^2+A_y^2+A_z^2}$$

Since the object is subject to the only acceleration of gravity, the value of the magnitude A must be equal to 1 g, and the minimum value that added three times gives 1 g is the aforesaid amount $1/\sqrt{3} \cdot g$ of 0.577 g. That is, in case the acceleration along one of the three orthogonal axes is lower than 0.577 g, the acceleration along at least one of the other two axes must be bigger than the above value 0.577 g to satisfy the equation.

The obtained number thus constitutes a good acceleration threshold $A_{th}$ for free-fall detection. In fact, to detect a free-fall event it is enough to acquire the acceleration values for the three detection axes x, y and z and check that their absolute values are at the same time lower than 0.577 g. Of course this value must be considered as a theoretical upper limit and a safeguard is needed to avoid false detections. Taking into account accelerometer offset accuracy and offset thermal drift, the value of the acceleration threshold $A_{th}$ is preferably set to 0.350 g. This value enables identification of the free-fall condition for any direction of free-fall of the portable apparatus 10 and it is at the same time insensitive to offsets due, for example, to temperature variations, component ageing, etc. In order for the above considerations to apply, the accelerometer 20 is preferably to be mounted close to the center of mass of the portable electronic apparatus 10, to reduce any centripetal acceleration, if the apparatus rotates during the free-fall.

It follows that during free-fall, each one of the acceleration signals $A_x$, $A_y$, and $A_z$ has an absolute value which is smaller than the acceleration threshold $A_{th}$ set via the threshold register 22. Therefore, the outputs of the threshold comparators 41-43, and hence the logic signal at the output of the AND logic gate 50 assume a high logic value. The counter 53 is enabled for counting, increasing the count signal at each switching of the clock signal CK. When the generated count signal exceeds the count threshold $C_{th}$, the signal at the output of the threshold comparator 54, i.e., the free-fall detection signal F, switches to the high logic state. The microprocessor circuit 18 then receives the free-fall detection signal F as interrupt signal, and consequently issues a control signal for undertaking the appropriate actions to protect the portable apparatus 10, and particularly the HDD device 11 from impact.

By appropriately setting the count threshold $C_{th}$, possible false indications of free-fall, due for example to vibrations of the table on which the portable electronic apparatus 10 is resting or to movements of the person who is using the portable electronic apparatus 10, do not cause switching of the free-fall detection signal F, and hence undesired parking of the read/write head 13. In fact, said false indications of free-fall have a duration smaller than the time interval corresponding to the count threshold $C_{th}$, and hence the free-fall detection signal F at the output of the threshold comparator 54 does not switch to the high logic value. For example, the count threshold $C_{th}$ can be set to a value corresponding to 8 ms.

In addition, via the enabling signals $EN_x$, $EN_y$, $EN_z$ supplied to the enabling stages 45-47 it is possible to disable detection of acceleration along a respective detection axis. In fact, only when said enabling signals $EN_x$, $EN_y$, $EN_z$ assume a given logic value, for example high, is the logic signal at output from the respective threshold comparator 41-43 sent to the AND logic gate 50. This is useful when it is certainly known what the orientation assumed by the portable electronic apparatus 10 will be during free-fall, in order to disable the detection axis or axes that is or are not important for the purposes of free-fall detection.

Figure 8:
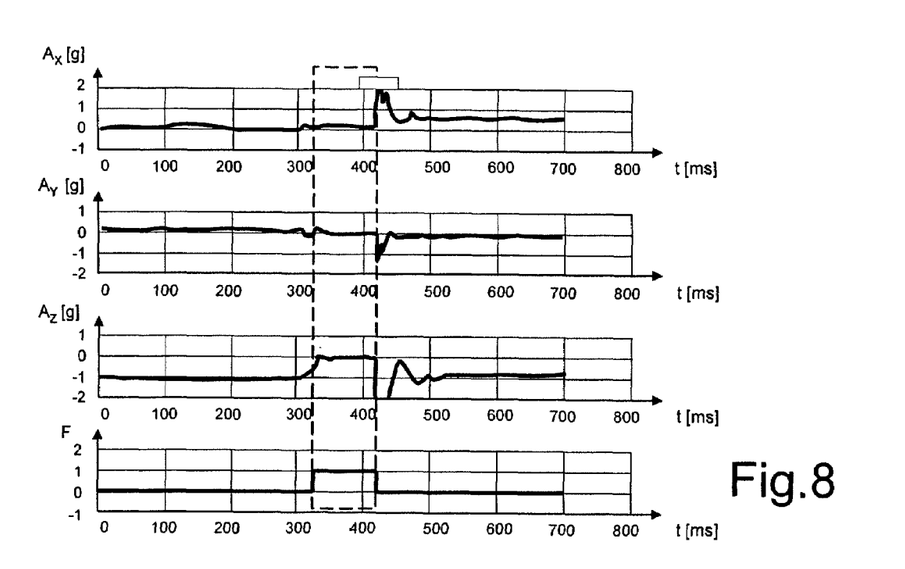
FIG. 8 shows time plots of some quantities associated to the system of FIG. 3.

FIG. 8 illustrates by way of example time plots of the acceleration signals $A_x$, $A_y$, and $A_z$ and of the free-fall detection signal F during a free-fall event of a portable electronic apparatus which is dropped from a typical desk height (about 70 cm). In particular, the free-fall event is highlighted by a dashed rectangle, while the following time interval corresponds to the portable electronic apparatus impacting to the ground.

The response times of the free-fall detection device 16 are very short and enable suitable actions for protecting the portable apparatus 10 to be carried out promptly.

Consider, by way of example, the case of a portable apparatus provided with hard disk which drops onto the floor from a height of one meter. The fall time t is calculated using the equation:

$$t = \sqrt{2 \cdot \frac{h}{g}}$$

where h is the initial height of the fall. Substituting the numeric values, a fall time of approximately 450 ms is obtained.

The response time of the free-fall detection device 16 for detecting the free-fall event is approximately 5 ms, the waiting time to prevent false free-fall indications is set to 8 ms (a value corresponding to the count threshold $C_{th}$), and the time necessary for the processor unit 18 to receive the free-fall detection signal F and to issue an appropriate signal for controlling parking in a safe position of the read/write head 13 of the hard disk 11 is approximately 2 ms. Considering moreover a time approximately of 30 ms for parking the read/write head 13, it follows that the time necessary for bringing the portable electronic apparatus 10 into a safe position is equal to approximately 45 ms, i.e., much less than the fall time calculated previously.

Figure 9:
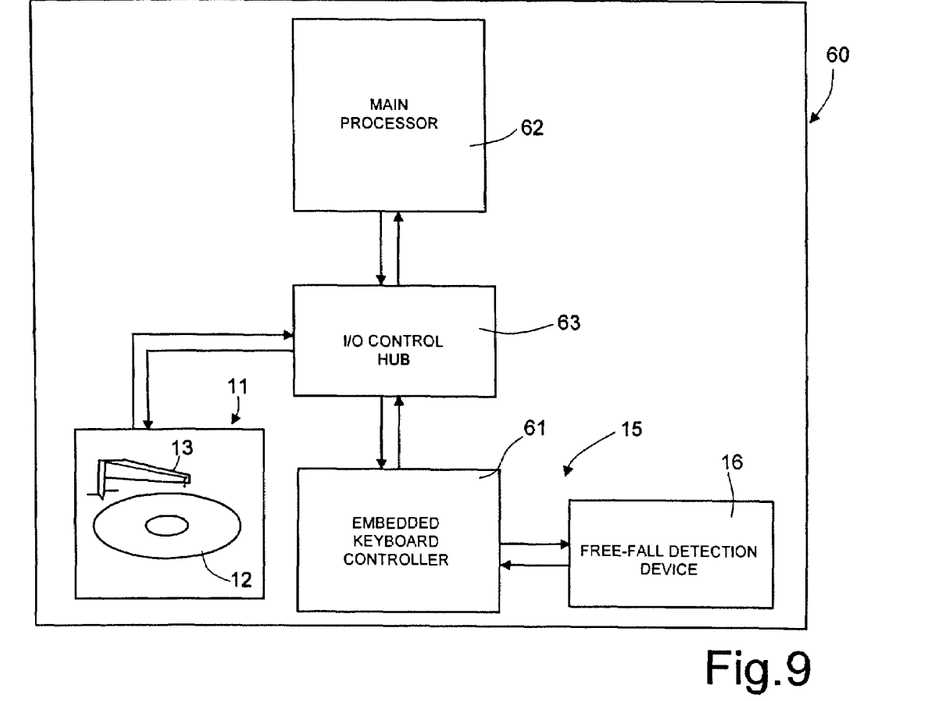
FIG. 9 shows an example of application of the free-fall protection system according to the invention.

FIG. 9 illustrates by way of example the application of the free-fall protection system 15 in a typical architecture of a portable PC 60. Since the above architecture is of a known type, only the elements directly related to the operation of the free-fall protection system 15 are illustrated.

In detail, the free-fall detection device 16 is connected to an embedded keyboard controller 61 provided internally with a microprocessor (corresponding to the processor unit 18). The embedded keyboard controller 61 is connected to a main processor 62 of the portable PC 60, through a I/O control hub 63 (e.g. ICH4-M). The main processor 62 is connected to HDD device 11 of the portable PC 60 through the I/O control hub 63 and a standard interface, for example an ATA interface.

At power on, the embedded keyboard controller 61 initializes the free-fall detection device 16, programs the acceleration threshold $A_{th}$ through the interface 25, and enables the interrupt feature. Then, upon detecting a free-fall event, the free-fall detection device 16 causes the free-fall detection signal F to switch to the high logic level, and issues it as interrupt signal to the microprocessor of the embedded keyboard controller 61. The latter interrupts the main processor 62, which immediately issues an unload command to the HDD device 11 through the I/O control hub 63 and the standard interface, to park the read/write head 13. Then, the main processor 62 executes code to monitor the free-fall condition. In particular, no access to the HDD device 11 is allowed during the period preceding the predicted ground impact. After the impact, the main processor 62 monitors the settlement of the electronic portable apparatus 10, through the accelerometer 20 of the free-fall detection device 16 and unparks the read/write head 13 when it is considered safe to resume operations.

The free-fall detection device described above has the following advantages.

First, it is possible to detect a free-fall event with extremely short response times, so as to ensure an efficient protection for the portable apparatuses, and in particular for the associated data-storage devices. In fact, the free-fall detection device operates in real time mode, since the free-fall detection is executed by a purely hardware circuit and all the operations linked to free-fall detection are incorporated in a single integrated device, so that further processing by a processor unit in the portable apparatus is not required. In particular, the digital data provided by the accelerometer 20 are compared with the acceleration threshold $A_{th}$, and the free-fall detection signal F is generated completely by hardware without any instructions latency. Therefore, the operating frequency of the processor unit 18 is not critical and there is no lengthy instruction execution time, as compared to known systems (in particular for the acquisition in polling of the acceleration data, and the pretty cumbersome computation of the acceleration magnitude). The generated free-fall detection signal F is issued in real time as an interrupt digital signal to the processor unit 18, and so there is no interface delay between the processor unit 18 and the free-fall detection device 16.

Furthermore, the free-fall detection device makes it possible to distinguish and ignore any false detection of free-fall, thus rendering the detection of free-fall extremely reliable.

The described free-fall detection device can advantageously be used for proving the occurrence of an impact following upon a free-fall. This is useful for example in the analysis of apparatuses returned for technical assistance on account of operating faults. It is in fact possible, by reading the contents of the counter register 56, wherein the free-fall detection signal F is stored, to verify whether the presumed faults are in fact due to a destructive event. In the case where the above register is a counter, it is also possible to know the number of impacts that the portable apparatus has undergone.

Furthermore, the free-fall detection device can be used for gathering the height from the ground from which the portable apparatus has fallen, by calculating in a known way the duration of the free-fall (for example, by starting a counter at the instant of detection of free-fall, which corresponds to the switching of the free-fall detection signal F, and stopping it at the instant of impact with the ground, which can be detected in a known way).

Even though the free-fall detection device must be permanently supplied, its circuit simplicity renders power consumption practically negligible, i.e., such as not to influence significantly the consumption of the battery that supplies it. In particular, it is possible to place the system in power saving mode, in order to minimize power consumption.

Also, the use of a three-axis accelerometer for the detection of the free-fall event, allows for a successful free-fall detection independently of the spatial orientation that the portable electronic apparatus may have when it starts falling.

Finally, it is clear that modifications and variations may be made to what has been described and illustrated herein, without thereby departing from the scope of the present invention, as defined in the attached claims.

In particular, the processor unit 18 can be implemented by a dedicated processor, or any other processor unit, such as the main processor in the portable electronic apparatus, or the HDD device controller. Also, the parking command for the read/write head 13 of the HDD device 11 can be issued by another processor alerted by processor unit 18.

The components of the free-fall detection device 16 could be integrated in different dice of semiconductor material, which could be assembled in a single package.

Furthermore, even if a count threshold $C_{th}$ has been provided to avoid possible free-fall false detections, it is possible to provide for an immediate detection of the free-fall event, by directly connecting the output of the AND logic gate 50 to the interrupt input of the processor unit 18, in order to further reduce the response time of the free-fall detection device 16.

Also, even if a three-axis accelerometer is in general required to detect the free-fall event independently of the spatial orientation that the portable electronic apparatus may have when it starts falling, theoretically a two- or even single axis accelerometer could be used, in case the above orientation is known and forced. If cost is a concern for the overall free-fall protection system, an analog accelerometer could be used, with the drawback of a certain performance degradation in terms of response time.

Figure 10:
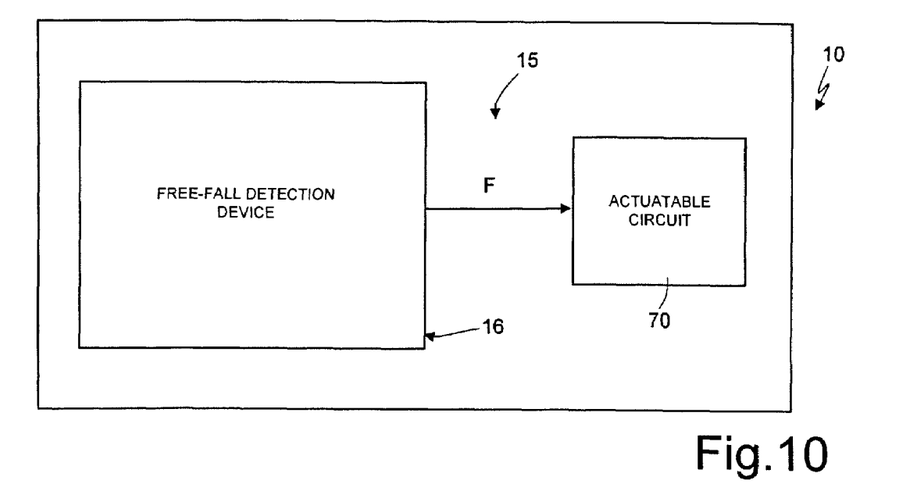
FIG. 10 is a block diagram of a different embodiment of the free-fall detection system according to the present invention.

Furthermore, the free-fall detection signal F generated in a continuous way by the free-fall detection device 16 could not be used as interrupt for a processor unit, but directly activate appropriate protection actions. For example, the above signal could directly control a switch designed to disable a given function within the portable electronic apparatus, or else control turning-on of a warning light, or emission of an alarm sound signal upon detection of the free-fall. In general, as shown in FIG. 10, the free-fall detection signal F could directly control an actuatable circuit 70 in the portable electronic apparatus 10, configured to activate appropriate protection actions for the portable electronic apparatus 10.

The entire free-fall protection system could also be arranged inside the HDD device 11. In this case, the chip of the free-fall detection device 16 is mounted to a printed circuit board of the HDD device 11, together with the control circuit of the HDD device 11. The free-fall detection signal F could directly be received and interpreted by the control circuit of the HDD device 11, to instantaneously park the read/write head 13.

In addition, different acceleration thresholds can be used for the various detection axes. Also, the accelerometer 20 could be different from the one described.

Two threshold comparators for each detection axis can be used, one for the free-fall detection, as described previously, and the other, in a known way, for the detection of impact ("shock detector") so as to integrate in a single device all functions required for protecting mass-storage devices in portable apparatuses.

Finally, the protection actions initiated by the free-fall protection system are not limited to the parking of the read/write head of the HDD device. For example, upon detecting of the free-fall condition, the spindle motor of the HDD device could be controlled to stop the rotating disk spinning movement, or, as another example, for a portable PC designed for rugged environment, air bag technology employed in automotive industry could be applied.

While there have been described above the principles of the present invention in conjunction with specific components, circuitry and bias techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

The invention claimed is:

1. A free-fall detection device for a portable apparatus comprising:
an acceleration sensor generating first, second, and third acceleration signals correlated to a respective component of a sensed acceleration along a respective detection axis; and
a free-fall detection module coupled to said acceleration sensor, wherein said free-fall detection module is configured to carry out a comparison between each one of said first, second, and third acceleration signals and a respective acceleration threshold, and to generate a free-fall detection signal according to the result of all three comparisons, wherein said free-fall detection signal has a first logic value indicative of a free-fall condition in the event that said first, second and third acceleration signals are all simultaneously lower than the respective acceleration threshold.

2. The device of claim 1, wherein said respective acceleration threshold is not higher than $1/\sqrt{3} \cdot g$.

3. The device of claim 2, wherein said respective acceleration threshold is equal to 350 mg.

4. The device of claim 1, wherein said free-fall detection module comprises a dedicated hardware circuit generating in a continuous way and in real-time said free-fall detection signal.

5. The device of claim 4, wherein said acceleration sensor and said dedicated hardware circuit are integrated in a single chip, said acceleration sensor being made as a Micro-Electro-Mechanical-System.

6. The device of claim 4 for a portable apparatus provided with a processor unit, wherein said dedicated hardware circuit has an output supplying said free-fall detection signal and configured to be connected to said processor unit.

7. The device of claim 4, wherein said dedicated hardware circuit comprises a comparison stage to carry out said comparison, and a detection stage connected to said comparison stage and generating said free-fall detection signal.

8. The device of claim 7, wherein said comparison stage comprises a threshold comparator for each of said acceleration signals, each of said threshold comparators receiving one respective of said acceleration signals and said respective acceleration threshold, and generating at output a respective logic signal; and wherein said detection stage comprises an AND logic gate receiving said logic signals.

9. The device of claim 8, wherein said detection stage further comprises false-detection rejecting means, connected to said AND logic gate and outputting said free-fall detection signal.

10. The device of claim 9, wherein said false-detection rejecting means comprise a counter receiving a clock signal and the logic signal outputted by said AND logic gate as count-enable signal; and a threshold comparator receiving the count signal generated by said counter and a count threshold, said threshold comparator generating said free-fall detection signal.

11. The device of claim 10, further comprising a first storage means for storing said respective acceleration threshold.

12. The device of claim 4, wherein said dedicated hardware circuit further comprises an enabling stage, which is connected to said comparison stage and receives an enabling signal for each of said detection axes; said enabling stage being configured to enable/disable detection of free-fall along each of said detection axes.

13. The device of claim 4, wherein said dedicated hardware circuit further comprises second storage means for storing the occurrence of said free-fall detection signal.

14. A free-fall protection system for a portable apparatus, comprising:
(a) a free-fall detection device configured to issue a warning signal upon detecting a free-fall condition of said portable apparatus, including:
(i) an acceleration sensor generating first, second, and third acceleration signals correlated to a respective component of a sensed acceleration along a respective detection axis; and
(ii) a free-fall detection module coupled to said acceleration sensor, to carry out a comparison between each one of said first, second, and third acceleration signals and a respective acceleration threshold, and to generate a free-fall detection signal according to the result of all three comparisons for generating a free-fall detection signal, wherein said free-fall detection signal has a first logic value indicative of a free-fall condition in the event that said first, second and third acceleration signals are all simultaneously lower than the respective acceleration threshold; and
(b) a protection device connected to said free-fall detection device and configured to activate protection actions for said portable apparatus upon receiving said warning signal.

15. The system of claim 14, wherein said protection device comprises a processor unit connected to an output of said free-fall detection device and having an interrupt input, said processor unit receiving at said interrupt input said warning signal for activating said protection actions.

16. The system of claim 15, wherein said free-fall detection device comprises first storage means for storing said respective acceleration threshold, and wherein said processor unit is further connected to said first storage means to program said respective acceleration threshold.

17. The system of claim 14 further comprising a data-storage device, wherein said protection device is configured to be connected to said data-storage device and said protection actions are intended to protect said data storage device from damage due to said free-fall condition.

18. The system of claim 17, wherein said data-storage device comprises a read/write head, and said protection actions comprise issuing a command for parking said read/write head in a safe position of said data-storage device.

19. A portable apparatus, comprising:
(a) a free-fall detection device configured to issue a warning signal upon detecting a free-fall condition of said portable apparatus, comprising:
(i) an acceleration sensor generating first, second, and third acceleration signals correlated to a respective component of a sensed acceleration along a respective detection axis; and
(ii) a free-fall detection module coupled to said acceleration sensor, to carry out a comparison between each one of said first, second, and third acceleration signals and a respective acceleration threshold, and to generate a free-fall detection signal according to the result of all three comparisons for generating a free-fall detection signal, wherein said free-fall detection signal has a first logic value indicative of a free-fall condition in the event that said first, second and third acceleration signals are all simultaneously lower than the respective acceleration threshold; and
(b) a protection device connected to said free-fall detection device and configured to activate protection actions for said portable apparatus upon receiving said warning signal.

20. The apparatus of claim 19, further comprising a data storage device having a read/write head and wherein said protection device further comprises a processor unit, wherein said processor unit controls a displacement of said read/write head according to said warning signal.

21. The apparatus of claim 20, wherein said free-fall detection device and said protection device are arranged within said data-storage device.

22. The apparatus of claim 21, wherein said apparatus is selected from the group consisting of laptop computers, personal data assistants, digital audio players, mobile phones, and digital cameras.

23. A data storage device comprising:
(I) a data storage medium;
(II) a read/write head associated with said data storage medium; and
(Ill) a free-fall protection system comprising:
  (a) a free-fall detection device configured to issue a warning signal upon detecting a free-fall condition of said data-storage device, comprising:
    (i) an acceleration sensor generating first, second, and third acceleration signals correlated to a respective component of a sensed acceleration along a respective detection axis; and
    (ii) a free-fall detection module coupled to said acceleration sensor to carry out a comparison between each one of said first, second, and third acceleration signals and a respective acceleration threshold and to generate a free-fall detection signal, wherein said free-fall detection signal has a first logic value indicative of a free-fall condition in the event that said first, second and third acceleration signals are all simultaneously lower than the respective acceleration threshold; and
  (b) a protection device connected to said free-fall detection device and configured to activate protection actions for said data storage device upon receiving said warning signal.

24. The data storage device of claim 23, wherein said free-fall protection system controls a parking of said read/write head in a safe position upon detecting said free-fall condition.

25. A method for protecting a portable electronic apparatus from a free-fall event comprising:
detecting a free-fall condition of said portable electronic apparatus based on an acceleration of said portable electronic apparatus; wherein said detecting a free-fall condition comprises:
acquiring first, second, and third acceleration signals correlated to a respective component of said acceleration along a respective detection axis;
comparing each one of said first, second, and third acceleration signals with a respective acceleration threshold;
detecting said free-fall condition according to the result of all three comparisons;
activating protection actions for said portable apparatus upon detection of said free-fall condition; and
generating a free-fall detection signal, wherein said free-fall condition is detected in the event that all three said acceleration signals are simultaneously lower than the respective acceleration threshold.

26. The method according to claim 25, wherein said free-fall condition is detected in the event said acceleration signals are simultaneously lower than the respective acceleration threshold for a preset time interval.

27. The method according to claim 25, wherein said portable apparatus includes a processor unit and the activating step includes issuing an interrupt to said processor unit.

* * * * *

US007450332C1

(12) EX PARTE REEXAMINATION CERTIFICATE (10200th)
United States Patent
Pasolini et al.

(10) Number: US 7,450,332 C1
(45) Certificate Issued: Jun. 25, 2014

(54) FREE-FALL DETECTION DEVICE AND FREE-FALL PROTECTION SYSTEM FOR A PORTABLE ELECTRONIC APPARATUS (75) Inventors: Fabio Pasolini, San Martino Siccomario (IT); Michele Tronconi, San Martino Siccomario (IT); Wen Lin, Longmont, CO (US); William R. Raasch, Longmont, CO (US)

(73) Assignee: STMicroelectronics S.R.L., Agrate Brianza (IT)

Reexamination Request:
No. 90/012,519, Sep. 12, 2012

Reexamination Certificate for:
Patent No.: 7,450,332
Issued: Nov. 11, 2008
Appl. No.: 11/166,770
Filed: Jun. 24, 2005

Related U.S. Application Data (60) Provisional application No. 60/590,997, filed on Jul. 26, 2004.

(30) Foreign Application Priority Data

Jun. 28, 2004 (IT) ............................. TO2004A0436

(51) Int. Cl.
*G11B 21/02* (2006.01)
*G11B 19/02* (2006.01)

(52) U.S. Cl.
USPC .......................... 360/75; 360/69; 360/78.04

(58) Field of Classification Search
None
See application file for complete search history.

(56) References Cited

To view the complete listing of prior art documents cited during the proceeding for Reexamination Control Number 90/012,519, please refer to the USPTO's public Patent Application Information Retrieval (PAIR) system under the Display References tab.

*Primary Examiner* — Kenneth J Whittington (57) ABSTRACT

In an integrated free-fall detection device for a portable apparatus an acceleration sensor generates acceleration signals correlated to the components of the acceleration of the portable apparatus along three detection axes. A dedicated purely hardware circuit connected to the acceleration sensor generates a free-fall detection signal in a continuous way and in real-time. The free-fall detection signal has a first logic value in the event that the acceleration signals are simultaneously lower than a respective acceleration threshold, and is sent to a processor unit of the portable apparatus as an interrupt signal to activate appropriate actions of protection for the portable apparatus. Preferably, the acceleration sensor and the dedicated purely hardware circuit are integrated in a single chip and the acceleration sensor is made as a MEMS.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-27 is confirmed.

\* \* \* \* \*